United States Patent [19]

Bothe

[11] Patent Number: 5,151,317
[45] Date of Patent: Sep. 29, 1992

[54] BIAXIALLY-ORIENTED POLYOLEFIN MULTI-LAYER FILM WHICH CAN BE SEALED ON BOTH SIDES, AND THE PREPARATION AND USE OF THE SAME

[75] Inventor: Lothar Bothe, Mainz-Gonsenheim, Fed. Rep. of Germany

[73] Assignee: Hoechst Aktiengesellschaft, Frankfurt am Main, Fed. Rep. of Germany

[21] Appl. No.: 622,523

[22] Filed: Dec. 5, 1990

[30] Foreign Application Priority Data

Dec. 5, 1989 [DE] Fed. Rep. of Germany ....... 3940173

[51] Int. Cl.$^5$ ................................................ B32B 7/02
[52] U.S. Cl. .................. 428/216; 428/319.7; 428/319.9; 428/349; 428/447; 428/448; 428/516; 428/910
[58] Field of Search .............. 428/349, 516, 910, 216, 428/447, 448, 319.7, 319.9; 156/244.11; 264/176.1

[56] References Cited

U.S. PATENT DOCUMENTS

| | | | |
|---|---|---|---|
| 4,384,024 | 5/1983 | Mitchell et al. | 428/349 |
| 4,419,410 | 12/1983 | Weiner | 428/516 |
| 4,419,411 | 12/1983 | Park | 428/516 |
| 4,502,263 | 3/1985 | Crass et al. | 53/396 |
| 4,508,804 | 4/1985 | Asao et al. | 430/62 |
| 4,654,252 | 3/1987 | Doyen | 428/213 |
| 4,716,068 | 12/1987 | Seifried et al. | 428/141 |
| 4,912,091 | 3/1990 | Bothe et al. | 428/35.2 |

FOREIGN PATENT DOCUMENTS 0008904  3/1980  European Pat. Off. .

OTHER PUBLICATIONS

*"Ullmann's Encyclopedia of Industrial Chemistry", 4th Edition, vol. 2, pp. 539–553. (Ullmanns Encyklopadie der technischen Chemie) *This reference considered to the extent of English description given in the specification on page 9.

*Primary Examiner*—Paul J. Thibodeau
*Assistant Examiner*—D. S. Nakarani
*Attorney, Agent, or Firm*—Foley & Lardner

[57] ABSTRACT

A five layer, biaxially-oriented polyolefin film, which is sealable on both exterior surfaces and includes a base layer of polypropylene which carries polyolefinic intermediate layers on both surfaces, and two sealing layers of sealable olefin polymers which are disposed, respectively, on the intermediate layers. The intermediate layers include 0.2–2.0% by weight of a polydialkylsiloxane having a viscosity of less than about 500 mm2/s. The film is particularly well-suited for the reception of aqueous printing inks or as a substrate for aqueous coating systems.

20 Claims, No Drawings

BIAXIALLY-ORIENTED POLYOLEFIN MULTI-LAYER FILM WHICH CAN BE SEALED ON BOTH SIDES, AND THE PREPARATION AND USE OF THE SAME

BACKGROUND OF THE INVENTION

The present invention relates to a biaxially-oriented polyolefin film which can be sealed on both sides and is comprised of five layers, the base layer consisting essentially of propylene polymers and the two sealing layers consisting essentially of sealable olefin polymers, and which is distinguished by universal applicability to high-speed packaging machines and is also readily printable. The present invention also relates to a process for the preparation of the film and to its use.

EP-A-0 008 904 discloses a biaxially-oriented, three-layer polyolefin film which can be sealed on both sides and in which the base layer is formed of propylene polymers and the two sealing layers i.e., the outer or top layers, are formed of sealable olefin polymers. Although this polyolefin film has good heat-sealability, it has, in particular, only a low scratch resistance, cannot be printed and also leaves much to be desired with respect to transparency and slip properties in conjunction with high-speed packaging machines.

German Offenlegungsschrift 3,247,998 discloses a biaxially-oriented polyolefin film consisting of three layers which is transparent and particularly readily sealable. Its base layer consists essentially of a propylene polymer, and the two sealing layers consist of an appropriate olefin polymer containing, as additives, 5 to 15% by weight of a low-molecular resin which is compatible with the olefin polymer, 5 to 15% by weight of a propylene homopolymer and 0.3 to 1.5% by weight of polydiorganosiloxane, the percentages by weight relating in each case to the sealing layer. This polyolefin multi-layer film possesses characteristics which are important for packaging films, namely a wide range of sealing, a low sealing temperature, high gloss and good transparency. The film also displays a relatively high scratch resistance and hence good running characteristics on high-speed packaging machines of various types. However, it lacks another characteristic which is also important, namely good printability.

A biaxially-oriented polyolefin film which can be sealed on both sides and comprises three layers is also disclosed in U.S. Pat. No. 4,419,411. In this film an additive combination is also incorporated in both of the sealing layers. They each contain 0.15 to 0.4% by weight of polysiloxane and 0.05 to 0.5% by weight of silicon dioxide, the percentages by weight relating in each case to the sealable layer. The base layer is made of polypropylene (as the main component) and contains a small amount of a monocarboxamide. Part of the amide migrates from the base layer into the two sealing layers and onto the surface thereof (external face), so that polysiloxane, silicon dioxide and the monocarboxamide are present in incorporated form in each sealing layer, and the monocarboxamide is also present on the outer faces of the two sealing layers. The polyolefin multi-layer film described is stated to have a particularly low coefficient of friction. However, this film also suffers in particular from the disadvantage that it is not printable.

SUMMARY OF THE INVENTION

It is therefore an object of the present invention to provide a biaxially-oriented polyolefin film which can be sealed on both exterior surfaces and is comprised of five layers and which has the important characteristics mentioned above and, in addition, is also readily printable or coatable. The new polyolefin multi-layer film should, in particular, be readily sealable on both exterior surfaces and should have excellent running characteristics on packaging machines, and it should furthermore also be printable or coatable on one or both exterior surfaces. Another object of the present invention is to provide a process for producing the above-described film and a packaging material which incorporates the film.

In accomplishing the foregoing objects there is provided according to the present invention a five layer, biaxially-oriented polyolefin film having two exterior surfaces which can be sealed, comprising a base layer comprised of propylene and having a first and second surface, first and second polyolefinic intermediate layers disposed on the first and second surfaces, respectively, of the base layer, and first and second sealing layers comprised of a sealable olefin polymer and disposed on the first and second intermediate layers, respectively, wherein said intermediate layers each include about 0.5 to 2% by weight, preferably 0.6 to 1.5% by weight, most preferably 0.7 to 1.0% by weight relative to the weight of said intermediate layers, of a polydialkylsiloxane having a viscosity of less than about 500 mm$^2$/s, in particular of between about 100 and 10 mm$^2$/s. Also provided according to the present invention is a process for producing the above-described film and a packaging material which incorporates the film.

Further objects, features and advantages of the present invention will become apparent from the detailed description of preferred embodiments that follows.

DETAILED DESCRIPTION OF THE PREFERRED EMBODIMENTS

The polydialkylsiloxane incorporated in the intermediate layers preferably has 1 to 4 carbon atoms in its alkyl groups and a viscosity, at about 25° C., of less than about 500 mm$^2$/s, preferably or less than about 200 mm$^2$/s, in particular of about 10 to 100 mm$^2$/s. Particular preference is given to polydimethylsiloxane. In the case of polydimethylsiloxane, the viscosity range of, for example, about 10 to 100 mm$^2$/s at about 25° C. corresponds to a mean molecular weight of about 1,200 to 5,700 g/mol.

The base layer of the multi-layer film according to the present invention is comprised of a propylene polymer which is made predominantly of propylene and has a melting point of about 140° C. or higher, preferably of about 150° to 170° C. Isotactic polypropylene having an n-heptane-soluble proportion of about 15% by weight or less, copolymers of ethylene and propylene having an ethylene content of about 10% by weight or less, and copolymers of propylene and C4 to C8 α-olefins having an α-olefin content of 10% by weight or less represent preferred propylene polymers for the base layer, isotactic polypropylene being particularly preferred. In general, the propylene polymer of the base layer has a melt flow index of about 0.5 g/10 minutes to 10 g/10 minutes, preferably of about 1.5 g/10 minutes to 4 g/10 minutes, determined at about 230° C. and at a loading of about 21.6N in accordance with DIN 53 735.

The intermediate layers present on the two surfaces of the base layer are comprised of polymers having substantially the same chemical composition as the base layer, with the exception that their melt flow index should be higher than the melt flow index of the polymer constituting the base layer.

The sealing layers of the multi-layer film according to the present invention are comprised of a sealable olefinic polymer. Advantageous olefin polymers are ethylene homopolymers, copolymers formed from ethylene and propylene or from ethylene or propylene and 1-butene or another $\alpha$-olefin having 5 to 10 carbon atoms, terpolymers formed from ethylene, propylene and 1-butene or another $\alpha$-olefin having 5 to 10 carbon atoms, or mixtures of these polymers. It is preferable to employ ethylene/propylene copolymers, ethylene/butylene copolymers, propylene/butylene copolymers, ethylene/propylene/butylene terpolymers or mixtures of these polymers. Olefin polymers which are particularly preferred for the sealing layers are ethylene/propylene copolymers having propylene as the main component and an ethylene content of about 2 to 10% by weight (relative to the copolymer), propylene/butylene copolymers having propylene as the main component and a butylene content of about 5 to 25% by weight (relative to the copolymer) and ethylene/propylene/butylene terpolymers having propylene as the main component, about 0.5 to 7% by weight of ethylene and about 5 to 30% by weight of butylene (the percentages by weight relate to the terpolymer) and also mixtures of these polymers.

The olefin polymer of the sealing layers has a lower melting point than the propylene polymer of the base layer and of the intermediate layers. The melting point of the olefin polymer is, in general, within about 80° to 160° C., preferably from about 100° to 140° C. The melt flow index of the olefin polymer of the sealing layers is higher than that of the propylene polymers and of the intermediate layers. The olefin polymer employed for the sealing layers has a melt flow index of, in general, about 1 to 12 g/10 minutes, preferably of about 3 to 9 g/10 minutes, at about 230° C. and a loading of about 21.6N in accordance with DIN 53 735.

Any surface treatment of the sealing layers which may be desired, such as a flame or corona treatment, is performed following the last stretching stage. For the corona treatment, which can be carried out by any of the known methods, it is expedient to use a procedure in which the film is passed between two conductor elements acting as electrodes, and to apply, between the electrodes, a voltage, in most cases an alternating voltage, sufficiently high (about 10,000 volt and 10,000 Hertz) to enable spray or corona discharges to take place. As a result of the spray or corona discharges, the air above the surface of the film is ionized and combines with the molecules on the surface of the film, so that polar incorporations are formed in the essentially non-polar polymer matrix. In accordance with the present invention, one or both sealing layers can be subjected to corona treatment.

The film according to the present invention exhibits particularly good adhesive properties towards aqueous coating compositions. Furthermore, in order to improve even further certain properties of the polyolefin film according to the present invention, it is possible for the base layer, the two intermediate layers and the sealing layers to include an effective amount of additives, preferably antistatic agents, antiblocking agents, slip agents, fillers, pigments, dyes, stabilizers and/or low-molecular resins, which are compatible with the polymers of the base layer, the intermediate layers and the sealing layers.

Preferred antistatic agents are saturated aliphatic, tertiary amines containing an aliphatic radical having 10 to 20 carbon atoms and substituted by 2-hydroxyalkyl-($C_1$–$C_4$) groups, amongst which N,N-bis-(2-hydroxyethyl)alkylamines having $C_{10}$–$C_{20}$ groups, preferably $C_{12}$–$C_{18}$ groups, as the alkyl groups are particularly suitable. The effective amount of antistatic agent is within about 0.05 to 3% by weight, relative to the weight of the respective layer.

Advantageous antiblocking agents, which preferably are added to the sealing layers, include inorganic additives, such as silicon dioxide, calcium carbonate, magnesium silicate, aluminum silicate, calcium phosphate and the like, nonionic surfactants, anionic surfactants and/or incompatible organic polymers, such as polyamides, polyesters, polycarbonates and the like. The effective amount of anti-blocking agent is within about 0.1 to 2% by weight, relative to the layer.

Examples of slip agents are higher aliphatic acid amides, higher aliphatic acid esters, waxes and metal soaps. The effective amount of slip agent is within about 0.1 to 2% by weight, relative to the layer.

Stabilizers which can be employed are the customary compounds which have a stabilizing action on ethylene polymers, propylene polymers and other $\alpha$-olefin polymers. The effective amount is, in general, about 0.1 to 2% by weight, relative to the layer.

The low-molecular resin recommended is a natural or synthetic resin having a softening point of about 60° to 180° C., preferably of about 80° to 130° C. (determined as specified in ASTME 28). Amongst the numerous low-molecular resins, the hydrocarbon resins are preferred, specifically in the form of petroleum resins, styrene resins, cyclopentadiene resins and terpene resins. These resins are described in Ullmanns Enzyklopädie der Techn. Chemie ["Ullmann's Encyclopedia of Industrial Chemistry"], 4th Edition, Volume 2, pages 539 to 553.

The petroleum resins are hydrocarbon resins prepared by polymerizing deep-decomposed petroleum materials in the presence of a catalyst. These petroleum materials usually include a mixture of resin-forming substances, such as styrene, methylstyrene, vinyltoluene, indene, methylindene, butadiene, isoprene, piperylene and pentylene. Styrene resins are low-molecular homopolymers of styrene or copolymers of styrene with other monomers, such as $\alpha$-methylstyrene, vinyltoluene and butadiene. The cyclopentadiene resins are cyclopentadiene homopolymers or cyclopentadiene copolymers obtained from coal tar distillates and fractionated petroleum gas. These resins are prepared by subjecting the materials containing cyclopentadiene to a high temperature for a very long time. Depending on the reaction temperature, it is possible to obtain dimers, trimers or high polymers. The terpene resins are polymers of terpenes, i.e., hydrocarbons of the formula $C_{10}H_{16}$, which are present in nearly all the essential oils and oil-containing resins of plants, and phenol-modified terpene resins. Special examples of terpenes which should be mentioned are $\alpha$-pinene, $\beta$-pinene, dipentene, limonene, myrcene, bornylene, camphene and similar terpenes. The hydrocarbon resins can also comprise the so-called modified hydrocarbon resins. Modification is generally effected by reacting the raw materials before polymerization, by introducing special monomers or by reacting the polymerized product, the reactions carried out being, in particular, hydrogenations or partial hydrogenations.

The hydrocarbon resins employed are preferably styrene homopolymers, styrene copolymers, cyclopentadiene homopolymers, cyclopentadiene copolymers and/or terpene polymers having a softening point in each case of about 60° to 180° C., preferably of about 80° to 130° C. In the case of the unsaturated polymers the hydrogenated product is preferred.

The effective amount of low-molecular resin is about 3 to 15% by weight, preferably about 5 to 10% by weight, for use in the sealing layers, and about 10 to 30% by weight for use in the intermediate layers.

Further inert additives, such as fillers or pigments, may be incorporated in the base layer or, preferably in the intermediate layers, in the form of evenly distributed fine particles. The average particle size expediently is about 0.02 to 4 $\mu$m, preferably about 0.3 to 1 $\mu$m. The content of inert additives in general is about 1 to 25% by weight, particularly about 5 to 15% by weight, relative to the respective layer. The inert additives particularly comprise pulverulent inorganic additives, for example carbonates of alkali metals and alkaline earth metals, such as calcium carbonate (chalk); sulfates, such as barium sulfate; and/or oxides, such as inorganic silicon compounds, in particular magnesium silicate (talcum), Na-Al-silicate, silicon dioxide, glass or titanium dioxide or mixtures of the compounds enumerated. During the extrusion of the film, these fine-particulate additives, which are, e.g., present in the form of a powder, are worked into the plastic melt for the base layer or the intermediate layers and dispersed in the melt. It is particularly advantageous to employ the masterbatch technique for working the inert particles and other additives into the polymers.

In another embodiment, the inert particles comprise an organic plastics material, which is incompatible with the polymers of the base layer, the intermediate layers and the sealing layers and has a higher melting point than the latter. These polymers include styrene polymers and acryl polymers, in particular polystyrene and polymethyl methacrylate, fluorinated hydrocarbon polymers, polyamides and polyesters, particularly polybutylene terephthalate. It is also possible to employ a combination of organic and inorganic inert particles.

The inert particles partially protrude from the base layer or the intermediate layers, whereby the protruding portions of their surfaces are completely covered by the sealing layers. In a preferred embodiment, at least one of the sealing layers has a thickness which is less than the average particle size. Such a relatively thin sealing layer is given a textured surface structure by the particles projecting from the base layer, which leads to an increased roughness of the film surface. The desired roughness value of a film surface is set by varying the concentration of the inert particles, the average particle size and the thickness of the top layer. Advantageously, the average peak-to-valley height (surface roughness $R_z$) of the film surface is between about 0.5 and 5 $\mu$m, particularly between about 1 and 4 $\mu$m, determined according to DIN 4768, with a cut-off of about 0.25 mm.

In a preferred embodiment, the base layer has a porous structure. As a result thereof, the actual density of the film is less than the calculated density based on the weight of the employed mixture of polypropylene and inert particles. In particular, the density of the film is about 0.50 to 0.85 g/cm$^3$. If the density is too low, the film strength is insufficient. The porous structure results from micro-cracks, micro-cavities or vacuoles (voids) which form during the stretching of the coextruded film when solid particles are present in the base layer. The temperature conditions for the stretching process are such that the polymer matrix of the base layer is torn at the surface of the inert particles, which leads to the formation of the free, unfilled spaces i.e., the above-mentioned voids or micro-cavities, in the film. An increased number of voids and hence a reduced density of the film can be achieved by increasing the concentration of solid particles.

The thickness of the polyolefin multi-layer film according to the present invention can vary within wide limits and depends especially on the intended use. Its total thickness is, in general, about 10 to 120 $\mu$m, preferably about 20 to 80 $\mu$m, the intermediate layers and the sealing layers being in each case about 0.2 to 4 $\mu$m, preferably about 0.5 to 1.5 $\mu$m, thick.

The preparation of the polyolefin film according to the present invention, which is comprised of five layers, is effected by a coextrusion process. Within the scope of this process, the procedure followed is to coextrude the melts corresponding to the individual layers of the film through a flat die, to chill the film obtained by coextrusion in order to solidify it, to stretch (orient) the film biaxially, to heat-set the biaxially stretched film and to subject to corona treatment the sealing layer(s) scheduled for corona treatment. The biaxial stretching (orientation) can be carried out simultaneously or successively, successive biaxial stretching, in which stretching is first carried out longitudinally, i.e., in the machine direction, and then transversely, i.e., perpendicularly to the direction of the machine, being preferred. Thus, as in the conventional coextrusion process, the polymer or the polymer mixture of the individual layers is first compressed or liquefied in an extruder. The melts are then forced simultaneously through a flat die (slot die), and the multilayer film which has been forced out is chilled and solidified on one or more rolls which are kept at about 30° to 50° C. by cooling. The film thus obtained is then stretched longitudinally and transversely to the direction of extrusion, which results in an orientation of the molecular chains. It is preferable to stretch in a ratio of about 4 to 7:1 in the longitudinal direction and preferably to stretch in a ratio of about 8 to 10:1 in the transverse direction. The longitudinal stretching is carried out at a film temperature of, preferably, about 120° to 140° C., and the transverse stretching is preferably carried out at about 160° to 175° C. It will be expedient to carry out the longitudinal stretching by means of two rollers running at different speeds, corresponding to the stretching ratio desired, and to carry out the transverse stretching by mean of an appropriate tenter frame. After the film has been stretched biaxially it is heat-set, i.e., subjected to heat treatment. In this process the film is kept at a temperature of about 150° to 160° C. for about 0.5 to 10 seconds. As mentioned hereinbefore, the corona treatment is preferably carried out by means of an alternating voltage of about 10,000 volt and about 10,000 Hertz. The film prepared in this way is wound up in a customary manner by means of a winding unit. For an exact metering of the additives, it is in most cases advantageous to employ the so-called masterbatch technology.

The polyolefin multi-layer film according to the present invention is particularly suitable for use as a packaging film on high-speed packaging machines. This is because it possesses all the important properties demanded from polyolefin films with respect to use on high-speed machines. In particular, it can be sealed on both sides, has excellent running characteristics and at the same time good printability and coatability.

The present invention will now be illustrated in greater detail by means of examples:

The examples and comparison examples below relate in each case to a biaxially oriented (longitudinal stretching ratio 5:1, transverse stretching ratio 10:1) polyolefin film having a base layer, two intermediate layers and two sealing layers. The base layer is comprised of an isotactic polypropylene having a fraction soluble in n-heptane of 5% by weight, a melting point of 165° C. and a melt flow index of 3.5 g/10 minutes at 230° C. and 21.6N loading (DIN 53 735). The intermediate layers are comprised of an isotactic polypropylene having a fraction soluble in n-heptane of 5% by weight, a melting point of 160° C. and a melt flow index of 4.5 g/10 minutes at 230° C. and 21.6N loading (DIN 53 735). The base layer is about 17 μm thick, the two intermediate layers applied to the two surfaces of the base layer each have a thickness of about 1 μm, and the two sealing layers provided on top of the free surfaces of the intermediate layers likewise have a thickness of about 1 μm each. The five-layer polyolefin films are prepared by the above-described coextrusion process.

The sealing layers are both comprised of a random ethylene/propylene copolymer having an ethylene content of 4.5% by weight. The raw material employed for the two top layers has a melt flow index of 6 g/10 minutes. The anti-blocking agent included therein is $SiO_2$ having an average particle size of 2 μm, which is added in an amount of 0.3% by weight.

EXAMPLE 1

The polymer for the intermediate layers included 1% by weight of a polydimethylsiloxane having a viscosity of 50 mm²/s. The film was not corona-treated.

EXAMPLE 2

Example 1 was repeated, except that one side of the film was corona-treated.

EXAMPLE 3

Example 1 was repeated, except that both sides of the film were corona-treated.

EXAMPLE 4

Example 1 was repeated, except that the polydimethylsiloxane having viscosity of 50 mm²/s was replaced by a polydimethylsiloxane having a viscosity of 100 mm²/s.

EXAMPLE 5

As Example 4, but including a single-sided corona treatment.

EXAMPLE 6

As Example 4, but including a double-sided corona treatment.

EXAMPLE 7

The raw material for the base layer and the intermediate layers included 0% by weight of polydimethylsiloxane, the raw material for the top layers included 0.5% by weight of a polydimethylsiloxane having a viscosity of 100 mm²/s. Both sides of the film were subjected to corona treatment.

The surface tension of the corona-treated top layer(s) was 40 mN/m in each case, determined according to DIN 53 364, with the films being first immersed in n-heptane for 5 minutes and measurement being performed after evaporation of the solvent. Employing this method, the surface tension of the film prepared in accordance with Example 7 could not be determined.

RESULTS

The films of Examples 2 to 6 were superior to the films of Examples 1 and 7. They simultaneously exhibited good sealing properties and running characteristics and their corona-treated surfaces were, in particular, readily printable. The film of Example 1 could not be printed, and it was found that the sealing properties of the film of Example 7 were inadequate and that its surface tension could not be measured employing a conventional method.

What is claimed is:

1. A five layer, biaxially-oriented polyolefin film having two exterior surfaces which can be sealed, comprising a base layer comprised of a propylene polymer and having a first and second surface, first and second polyolefinic intermediate layers disposed on said first and second surfaces, respectively, of said base layer, and first and second sealing layers comprised of a sealable olefin polymer and disposed on said first and second intermediate layers, respectively, wherein said first and second intermediate layers each include about 0.5 to 2.0% by weight of a polydialkylsiloxane which has a viscosity of less than about 500 mm²/s.

2. A polyolefin film according to claim 1, wherein said first sealing layer has been subjected to a corona treatment and said second sealing layer has not been subjected to a corona treatment.

3. A polyolefin film according to claim 1, wherein said first and second sealing layers have been subjected to a corona treatment.

4. A polyolefin film according to claim 1, wherein said polydialkylsiloxane has a viscosity of about 10 to 100 mm²/s.

5. A polyolefin film according to claim 1, wherein said polydialkylsiloxane includes alkyl groups having 1 to 4 carbon atoms.

6. A polyolefin film according to claim 1, wherein said polydialkylsiloxane comprises a polydimethylsiloxane.

7. A polyolefin film according to claim 1, wherein said first and second intermediate layers each include about 0.6 to 1.5% by weight of said polydialkylsiloxane.

8. A polyolefin film according to claim 7, wherein said first and second intermediate layers each include about 0.7 to 1.0% by weight of said polydialkylsiloxane.

9. A polyolefin film according to claim 1, wherein said base layer comprises a polymer selected from the group consisting of an isotactic polypropylene having an n-heptane-soluble proportion of about 15% by weight or less, a copolymer of ethylene and propylene having an ethylene proportion of about 10% by weight or less, and a copolymer of propylene and $C_4$ to $C_8$ α-olefin having an α-olefin proportion of about 10% by weight or less.

10. A polyolefin film according to claim 1, wherein said first and second intermediate layers further comprise a polymer selected from the group consisting of an isotactic polypropylene having a n-heptane-soluble proportion of about 15% by weight or less, a copolymer of ethylene and propylene having an ethylene proportion of about 10% by weight or less, and a copolymer of propylene and $C_4$ to $C_8$ α-olefin having an α-olefin proportion of about 10% by weight or less.

11. A polyolefin film according to claim 1, wherein said first and second sealing layers comprise a polymer selected from the group consisting of an ethylene homopolymer, a copolymer of ethylene and propylene, a copolymer of ethylene and butylene, a copolymer of propylene and butylene, a terpolymer of ethylene, propylene and butylene, and mixtures thereof.

12. A polyolefin film according to claim 1, further comprising at least one additive selected from the group consisting of an antistatic agent, antiblocking agent, slip agent, filler, pigment, dye, stabilizer and low-molecular resin.

13. A polyolefin film according to claim 2, wherein the exterior surface of said corona-treated first sealing layer is printed with an aqueous printing ink.

14. A polyolefin film according to claim 3, wherein the exterior surface of said first sealing layer is printed with an aqueous printing ink and the exterior surface of said second sealing layer is bonded to a sheet-like substrate by means of an aqueous adhesive.

15. A packaging film comprising a polyolefin film according to claim 1.

16. A polyolefin film according to claim 1, wherein the propylene polymer of said base layer comprises an isotactic polypropylene having a melting point of about 150° to 170° C. and a melt flow index of about 0.5 to 10 g/10 minutes determined at about 230° C. and at a loading of about 21.6N in accordance with DIN 53 735.

17. A polyolefin film according to claim 16, wherein said first and second intermediate layers comprise an isotactic polypropylene having a melt flow index higher than the melt flow index of said isotactic polypropylene comprising said base layer.

18. A polyolefin film according to claim 17, wherein said first and second sealing layers comprise a random ethylene/propylene copolymer having an ethylene content of about 2 to 10% by weight, a melting point of about 80° to 160° C., and a melt flow rate of about 1 to 12 g/10 minutes, determined at about 230° C. and at a loading of about 21.6N in accordance with DIN 53 735, wherein the melt flow index of said random copolymers of the sealing layers are higher than that of the propylene polymers of the base and intermediate layers.

19. A polyolefin film according to claim 18, wherein said intermediate layers comprises about 0.6 to 1.5% by weight of polydimethylsiloxane having a viscosity of about 10 to 100 $mm^2/s$ as said polydialkylsiloxane.

20. A polyolefin film according to claim 1, wherein said base layer has a porous structure.

* * * * *